UNITED STATES PATENT OFFICE 2,421,165

PROCESS FOR PREPARING NITRO AMINES

Murray Senkus, Terre Haute, Ind., assignor to Commercial Solvents Corporation, Terre Haute, Ind., a corporation of Maryland No Drawing. Application April 12, 1943, Serial No. 482,757

4 Claims. (Cl. 260—570.9)

My invention relates to a new and novel process for the preparation of certain nitro amines. Specifically, these new compounds may be represented by the following structural formula:

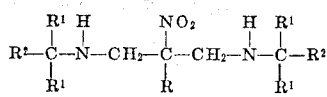

in which R may be aryl, alkyl, hydrogen or halogen, $R^1$ may be either hydrogen, hydroxymethyl or alkyl, and $R^2$ represents aryl, hydrogen, aralkyl, alkyl, or hydroxymethyl.

As examples of nitro amines which are included by the above generic formula, there may be mentioned 2-nitro-2-methyl-N,N'-diisopropyl-1,3 - propanediamine, 2 - nitro - 2 - phenyl - N,N'-dibenzyl - 1,3 - propanediamine, 2 - nitro - 2-chloro - N,N' - dibenzyl - 1,3 - propanediamine, 2 - nitro - 2 - bromo - N,N' - dibenzyl - 1,3 - propanediamine, 2 - nitro - 2 -methyl - N,N' - bis-(2 - hydroxy - 1 - methylisopropyl) - 1,3 - propanediamine, 2 - nitro - 2 - ethyl - N,N' - (bis-(trishydroxymethyl)methyl) - 1,3 - propanediamine, 2 - nitro - 2 - methyl - N,N' - di(1,1-bishydroxymethyl)ethyl - 1,3 - propanediamine, and the like.

Prior to the present invention, investigators in this field found that 1-nitroalkanes could be reacted with the condensation product of a secondary amine and formaldehyde, i. e., an N-(hydroxymethyl)dialkylamine. While making this observation, these investigators also attempted to react 1-nitroalkanes with the condensation product of a primary amine and formaldehyde, i. e., an N-(hydroxymethyl)alkylamine, but were unsuccessful, and finally came to the conclusion that such a reaction could not be made to proceed under any normal experimental conditions.

I have now discovered, however, that compounds of the class, which previous workers considered impossible to prepare, can be readily synthesized in good yields by reacting a primary aliphatic amine with a suitable nitro glycol in a ratio of one mole of glycol to two moles of the amine. In accordance with this procedure, the desired amine is reacted with a nitro glycol at a temperature ranging from between about 25–75° C. ordinarily in the presence of agitation. A suitable solvent such as water may be employed if desired, the presence or absence thereof generally being dependent upon the specific reactants employed. The reaction is permitted to proceed until the formation of water, as a result of the condensation, has substantially ceased. The normally liquid nitro amines produced by this process may be readily obtained from the crude reaction mixture in substantially pure form by merely subjecting said mixture to fractional distillation under reduced pressure. The products of this reaction, which are solids, are generally isolated by means of filtration and further purification thereof effected by recrystallization from a suitable solvent such as aqueous acetone, petroleum ether and the like.

Primary amines contemplated by my invention are represented by the following formula:

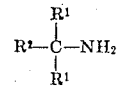

wherein $R^2$ is either hydrogen, aryl, aralkyl, alkyl, or hydroxymethyl, and $R^1$ may be hydrogen, hydroxymethyl or alkyl.

Specific primary amines suitable for use in my process, and which are included by the above generic formula are: benzylamine, phenylethylamine, 2-amino-2-methyl-1-propanol, 2-amino-2 - methyl - 1 - butanol, methylamine, isopropylamine, butylamine, isobutylamine, 2-amino-2-methyl - 1,3 - propanediol, tris(hydroxymethyl)-aminomethane, 2-amino-1,3-propanediol, and the like.

Nitro glycols that can be utilized in carrying out my invention constitute any of such compounds included by the general formula:

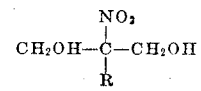

in which R represents either hydrogen, halogen, alkyl or aryl. Examples of such compounds are: 2 - nitro - 1,3 - propanediol, 2 - nitro - 2 - methyl - 1,3 - propanediol, 2 - nitro - 2 - chloro - 1,3-propanediol, 2 nitro - 2 - bromo - 1,3 - propanediol, 2 - nitro - 2 - ethyl - 1,3 - propanediol, 2-nitro-2-phenyl-1,3-propanediol, and the like.

The examples which follow are illustrative of the various types of nitro amines that come within the scope of my invention. They are likewise illustrative of the procedures whereby these new chemical compounds may be synthesized. However, it is to be specifically understood that such examples in no way limit the scope of my invention with respect to the process demonstrated therein, since I have found that the reaction involved is very general in nature and will occur under the conditions set forth when reacting substantially any primary amine of the class described, with a nitro glycol of the various types enumerated above.

Example I

Seventy-eight parts of 2-chloro-2-nitro-1,3-propanediol was reacted with 101 parts of benzylamine at 50° C. After approximately one-half hour, the temperature of the mixture was increased rather rapidly to about 65° C. at which value it was permitted to remain for approximately one-half hour. On cooling to room temperature, the crude product solidified, and after three recrystallizations from petroleum ether, amounted to 63 parts. The purified 2-nitro-2-chloro-N,N'-dibenzyl-1,3-propanediamine was a light brown crystalline material melting at 74.9° C.

Analysis. Calculated for $C_{17}H_{19}N_3ClO_2$: Cl, 10.64. Found: Cl, 10.75.

Example II

One hundred eighty parts of 2-amino-2-methyl-1-propanol, was added to a solution consisting of 135 parts of 2-nitro-2-methyl-1,3-propanediol and 100 parts of water. The resulting mixture was permitted to stand at room temperature until the reaction appeared to be complete, after which the mixture was chilled in order to promote crystallization. The crude crystalline product, thus obtained, was separated from the mother liquor by means of a centrifuge and amounted to 70 parts. On recrystallization from aqueous acetone, 2-nitro-2-methyl-N,N'-bis(2-hydroxy-1-methylisopropyl)-1,3-propanediamine was obtained in the form of white crystals melting at 125.1° C.

Analysis. Calculated for $C_{12}H_{27}NO_4$: N, 14.60. Found: N, 14.98.

The nitro amines of the type discussed above are in general either colorless syrupy liquids or white crystalline solids, and are soluble in methanol and benzene, but substantially insoluble in water.

The nitro amines of my invention exhibit utility as active ingredients in various types of insect sprays. These new compositions are likewise useful for numerous other varied and diversified purposes, including their use as intermediates for the preparation of valuable organic compounds. Other uses of these new materials will readily occur to those skilled in the art.

What I claim is:

1. A process for the preparation of nitro amines of the type:

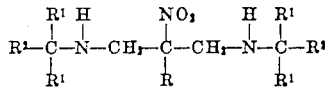

in which R is a member selected from the group consisting of alkyl, halogen, hydrogen and aryl; $R^1$ is a member selected from the group consisting of hydrogen, hydroxymethyl and alkyl, and $R^2$ is a member selected from the group consisting of aryl, hydrogen, aralkyl, alkyl, and hydroxymethyl, which comprises mixing at temperatures between about 25° C. and 75° C. an amine of the class

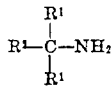

in which $R^2$ represents a member selected from the group consisting of hydrogen, aryl, alkyl, aralkyl, and hydroxymethyl, and $R^1$ is a member selected from the group consisting of hydrogen, hydroxymethyl and alkyl, with a nitro glycol of the formula:

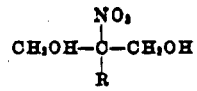

wherein R is a member selected from the group consisting of hydrogen, alkyl, halogen and aryl and allowing the mixture to stand until reaction has occurred.

2. A process for the preparation of nitro amines of the type:

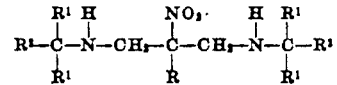

in which R is a member selected from the group consisting of alkyl, halogen, hydrogen and aryl; $R^1$ is a member selected from the group consisting of hydrogen, hydroxymethyl and alkyl, and $R^2$ is a member selected from the group consisting of aryl, hydrogen, alkyl, aralkyl, and hydroxymethyl, which comprises mixing approximately two moles of an amine of the class:

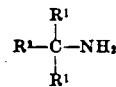

in which $R^2$ represents a member selected from the group consisting of hydrogen, aryl, alkyl, aralkyl, and hydroxymethyl, and $R^1$ is a member selected from the group consisting of hydrogen, hydroxymethyl, and alkyl, with approximately one mole of a nitro glycol of the formula:

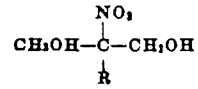

wherein R is a member selected from the group consisting of hydrogen, alkyl, halogen and aryl, at a temperature of between about 25 and 75° C. and allowing the mixture to stand until reaction has occurred.

3. A process for the preparation of 2-nitro-2-chloro-N,N'-dibenzyl-1,3-propanediamine, which comprises mixing 2-chloro-2-nitro-1,3-propanediol with benzylamine at temperatures between about 25° C. and 75° C. and allowing the mixture to stand until reaction has occurred.

4. A process for the preparation of 2-nitro-2-methyl-N,N'-bis(2-hydroxy-1-methylisopropyl)-1,3-propanediamine, which comprises mixing 2-nitro-2-methyl-1,3-propanediol with 2-amino-2-methyl-1-propanol at temperatures between about 25° C. and 75° C. and allowing the mixture to stand until reaction has occurred.

MURRAY SENKUS.

REFERENCES CITED

The following references are of record in the file of this patent:

UNITED STATES PATENTS

| Number | Name | Date |
|---|---|---|
| 2,301,259 | Cox | Nov. 10, 1942 |

OTHER REFERENCES

Mauny, Bul. Soc. Chim. de France 5, 4 (1937), 260–583, (pages 1451–1468).

Chem. Abstracts, vol. 28, p. 5039 (1934). (Copy in Pat. Off. Lib.)